United States Patent [19]
Barber et al.

[11] Patent Number: 5,294,137
[45] Date of Patent: Mar. 15, 1994

[54] TRANSPORT CONTAINER WITH INTEGRAL DOLLY

[75] Inventors: George L. Barber, Mt. Vernon; Curtis P. Taylor, Chagrin Falls; Richard A. Volker, N. Olmsted, all of Ohio

[73] Assignee: Hoover Group, Inc., Alpharetta, Ga.

[21] Appl. No.: 871,284

[22] Filed: Apr. 20, 1992

[51] Int. Cl.$^5$ ............................................. B62B 3/08
[52] U.S. Cl. ........................... 280/47.26; 280/47.315; 280/47.33; 220/4.04; 414/910
[58] Field of Search ............... 280/47.26, 47.24, 47.17, 280/47.12, 47.33, 47.2, 79.2, 47.371, 655.1; 220/4.04, 4.08, 4.09, DIG. 24, DIG. 1, DIG. 13; 414/457, 910

[56] References Cited

U.S. PATENT DOCUMENTS

| | | | |
|---|---|---|---|
| 1,014,475 | 1/1912 | Holloway | 280/47.26 |
| 1,408,400 | 2/1922 | Richards | 280/47.33 |
| 1,636,682 | 7/1927 | Carlson | 280/47.33 |
| 1,815,825 | 7/1931 | Bates | 280/47.33 |
| 4,717,168 | 1/1988 | Moon, Sr. | 280/655 |
| 5,139,278 | 8/1992 | Vlasicak | 280/47.26 |

Primary Examiner—Richard M. Camby
Attorney, Agent, or Firm—Harness, Dickey & Pierce

[57] ABSTRACT

The present invention relates to reusable bulk transport containers having four wheels attached thereto forming a dolly for easy movement of the containers by a single person. The containers are further equipped with four legs for supporting the containers upright wherein the four wheels are all spaced above the ground surface. Two of the legs are in the form of a kick-stand which can be rotatable to a raised position after which the container can be tilted onto the four wheels and the center of gravity spaced between the main and rear wheels such that when tilted to a wheeled position, the container is inherently stable and will not tip over.

25 Claims, 5 Drawing Sheets

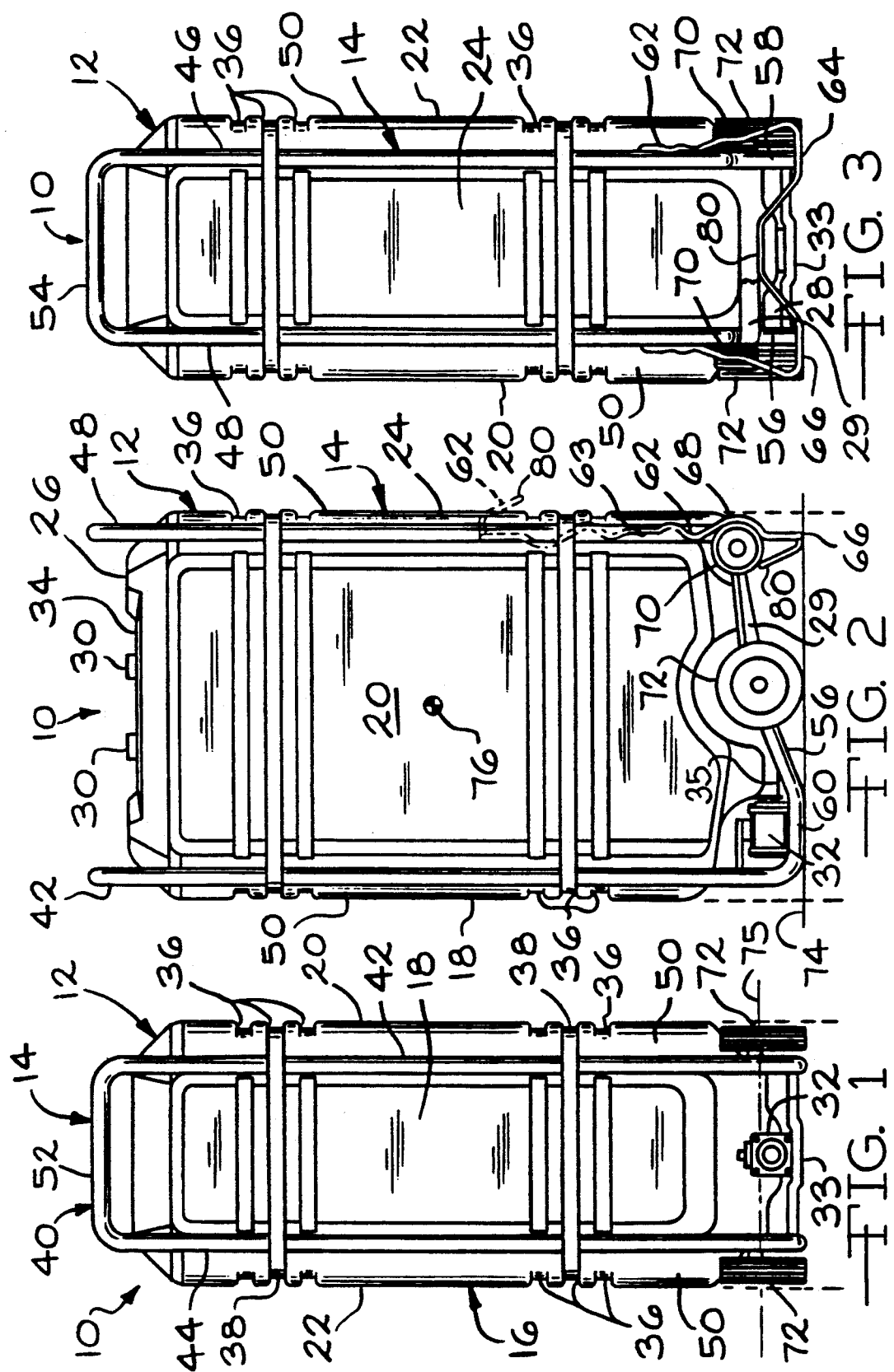

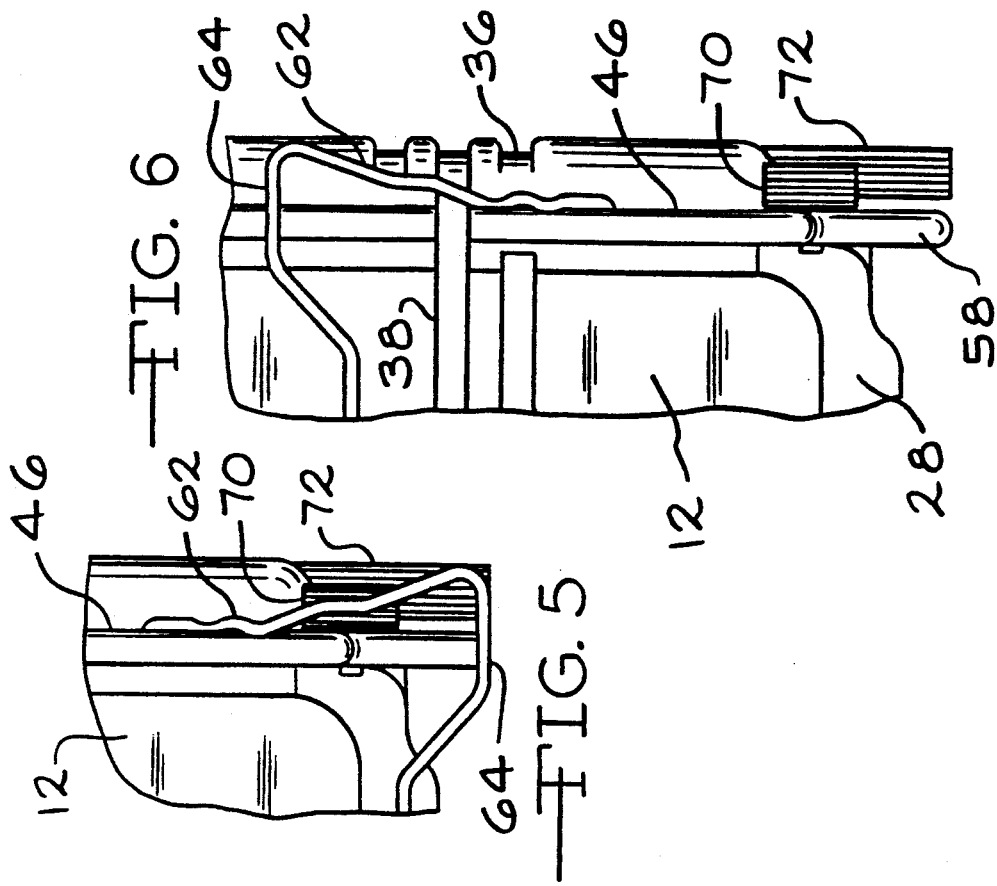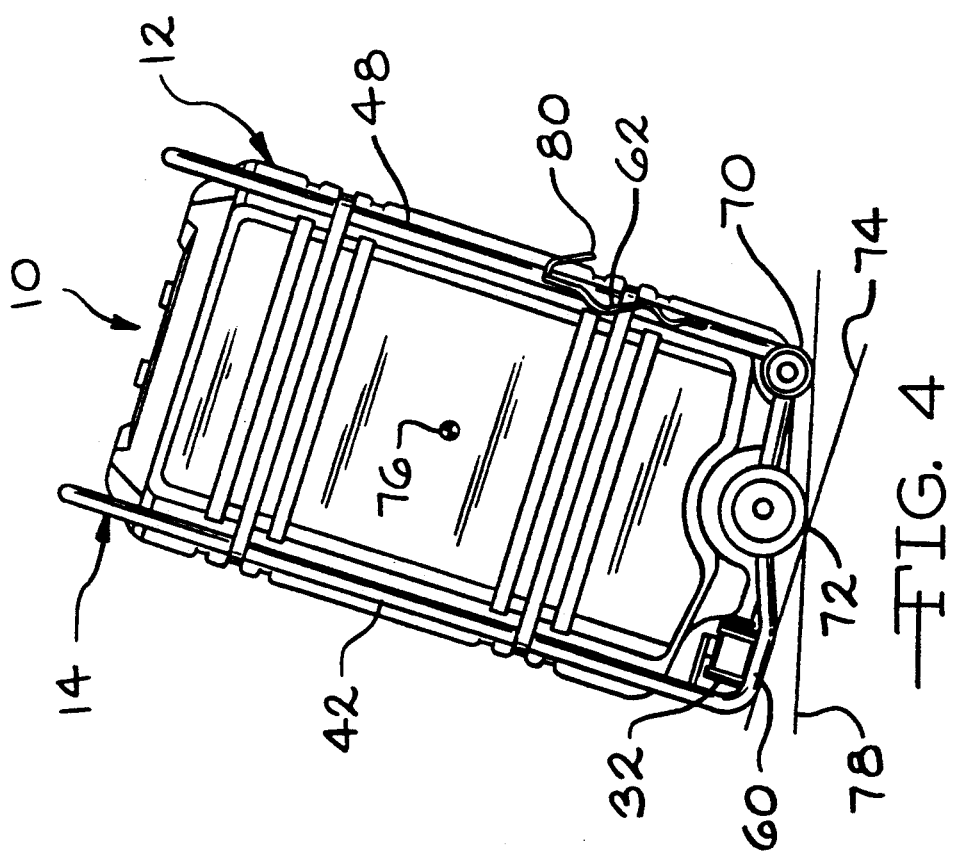

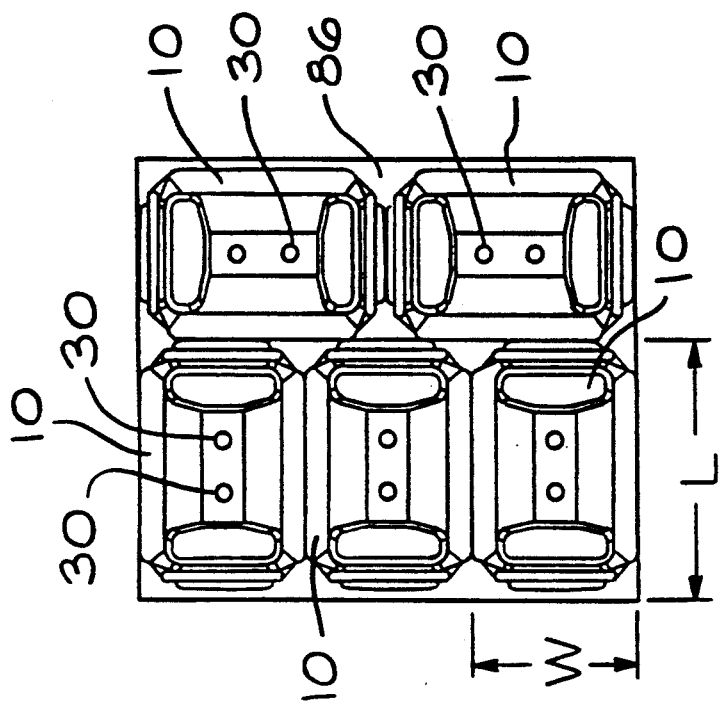
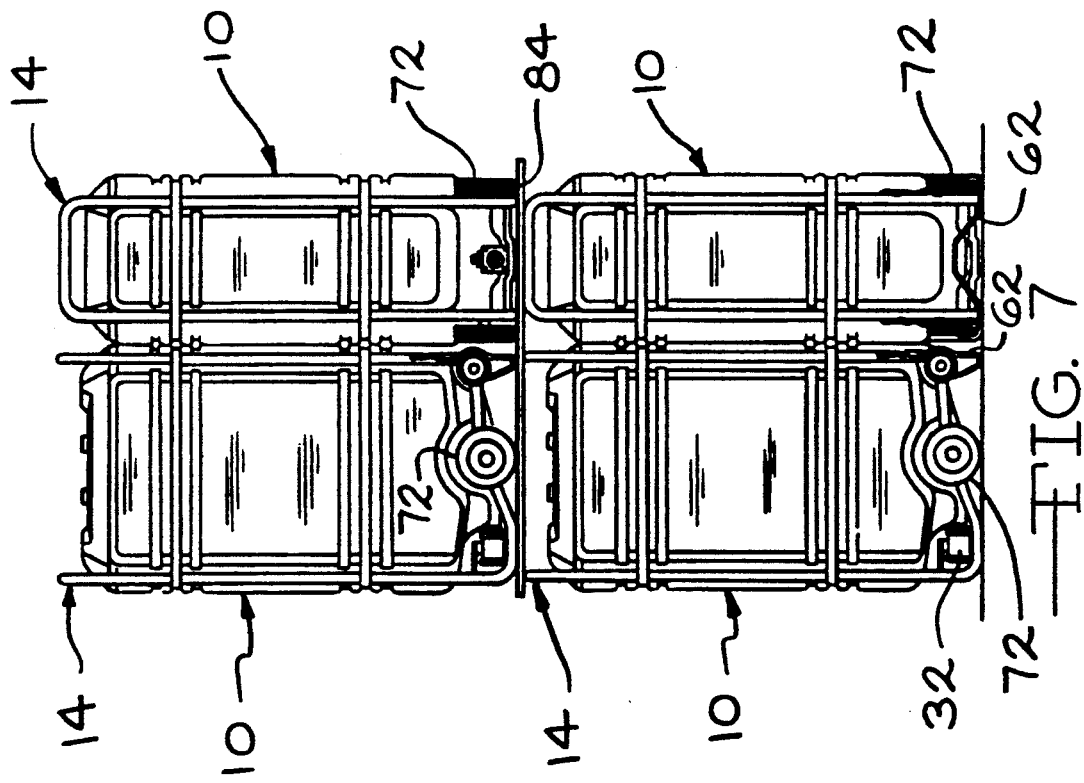

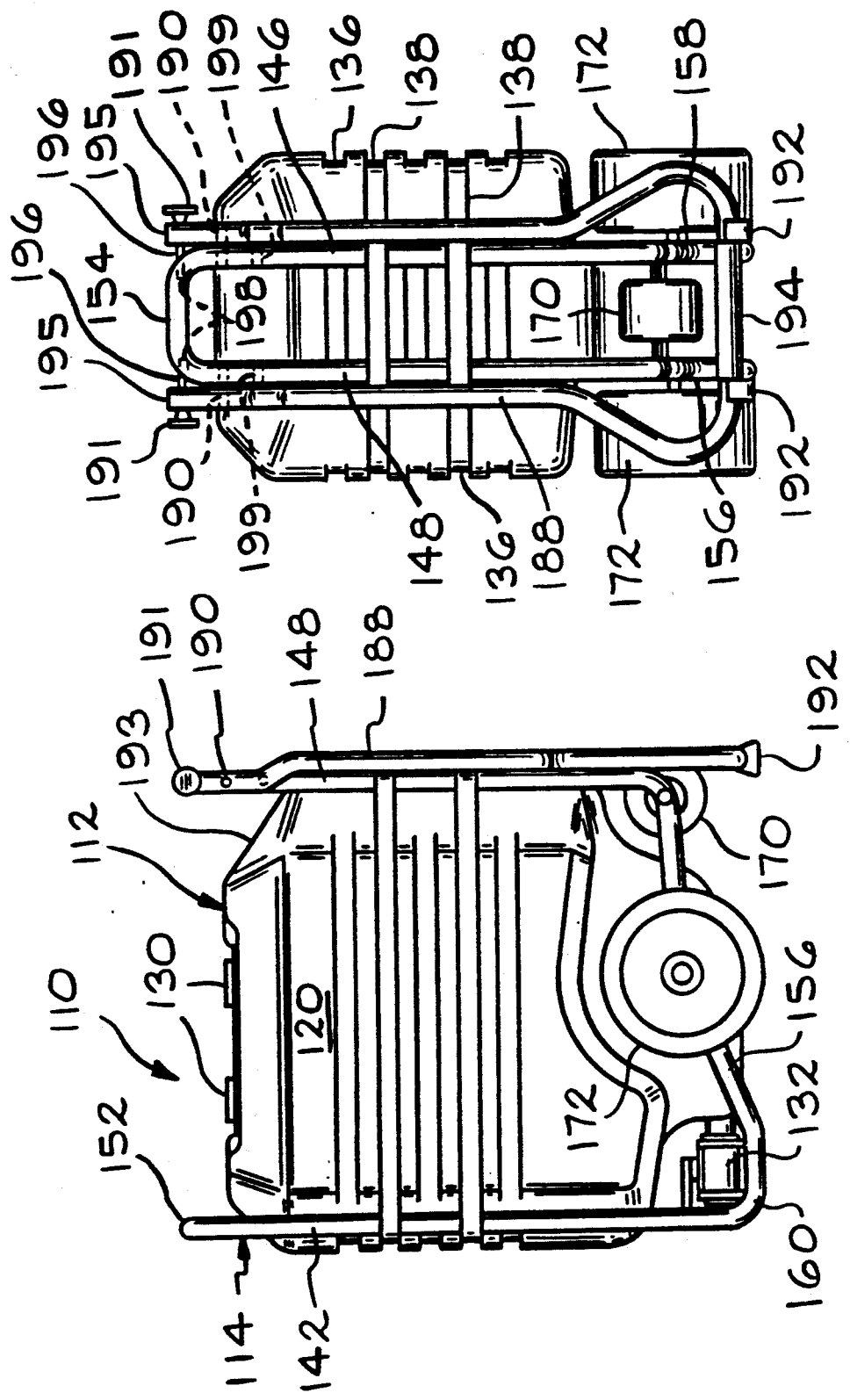

TRANSPORT CONTAINER WITH INTEGRAL DOLLY

BACKGROUND AND SUMMARY OF THE INVENTION

The present invention relates to reusable bulk transport containers and in particular to transport containers having wheels attached thereto forming a dolly for easy movement of a container by a single person.

Liquid material in bulk form is commonly stored and transported in a variety of large containers. The most common container being the conventional 55 gallon drum. The disadvantages of the conventional drum involve the cylindrical container's inefficient use of storage space and the difficulty in transporting a filled drum. To move a filled drum it is first necessary to tilt the drum and insert a dolly beneath the drum. Considerable effort is required to tilt the drum when full and, when tilted, the drum is not stable and can easily fall over, presenting a safety hazard.

It is an object of the present invention to provide a reusable transport tank overcoming the above disadvantages of a conventional 55 gallon drum.

It is an advantage of the transport container of the present invention that four wheels are mounted to the container to provide a dolly for easy movement of the container without requiring that the container be tilted to an unstable position prior to moving.

It is a feature of the container of the present invention that when the container is tilted to a movable position, placing the four wheels on the ground surface, that the center of gravity of the container is between the two wheel axles such that the container is inherently stable during movement.

It is still a further feature that the container is formed with a rectangular shape having planar walls so that multiple containers can be placed side-to-side with minimal waste of storage space.

A rotatable kick-stand is provided to form a pair of pivot legs to support the container upright during use. When it is desired to move the container, the kick-stand is raised and the container tilted onto its four wheels for movement. When the kick-stand is raised and before the container is tilted, the container remains upright with the container center of gravity between a pair of fixed legs and pair of main wheels. When tilted, the center of gravity is moved over the axle of the main wheels and is placed between the main and secondary wheels whereby the container remains stable.

Further objects, features and advantages of the invention will become apparent from a consideration of the following description and the appended claims when taken in connection with the accompanying drawings.

BRIEF DESCRIPTION OF THE DRAWINGS

FIGS. 1, 2 and 3 are front, side and rear elevational views respectively of the transport container of the present invention in an upright use position;

FIG. 4 is a side elevational view of the storage container of the present invention in a tilted movable position;

FIG. 5 is an enlarged fragmentary view of the kick-stand of the present invention in a down position supporting the container upright;

FIG. 6 is an enlarged fragmentary view similar to FIG. 5 showing the kick-stand in an up position for moving of the container;

FIG. 7 is an elevational view of a plurality of containers of the present invention stacked two high;

FIG. 8 is a plan view showing five containers of the present invention positioned upon a standard sized shipping pallet;

FIGS. 9 and 10 are side and rear elevational views respectively of an alternative embodiment of the transport container of the present invention in an upright use position.

DETAILED DESCRIPTION OF THE INVENTION

Figure 11:
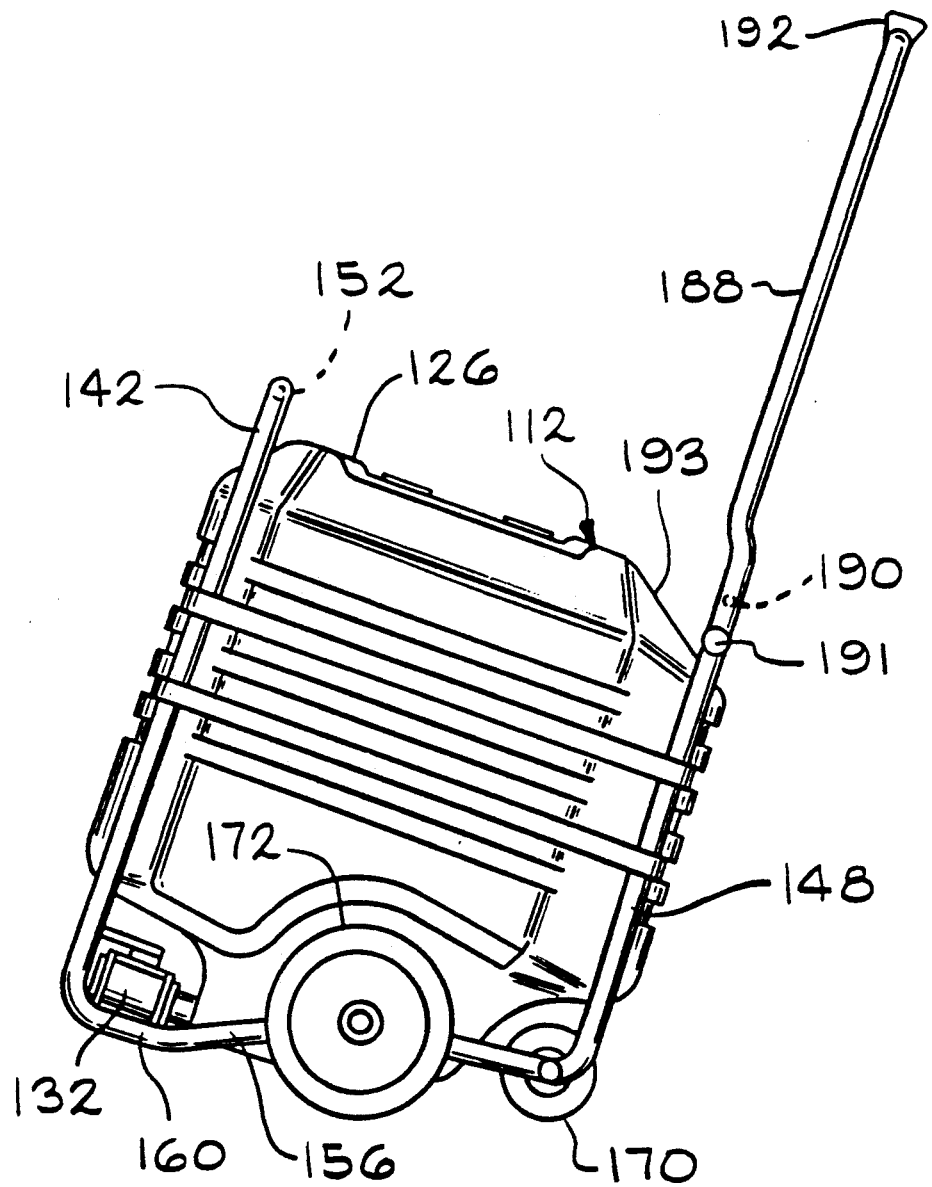
FIG. 11 is a side elevational view of the alternative embodiment of the transport container of FIGS. 9 and 10 shown in a tilted movable position.

The transport container of the present invention is shown in the Figures and designated generally at 10. In the preferred embodiment shown, container 10 is comprised of a tank or bottle 12 carried by a steel frame 14. The bottle 12 is preferably blow molded of High Density Polyethylene but other methods and materials can be used to manufacture the tank without departing from the present invention. The bottle 12 is preferably of a rectangular shape having an upright wall 16 comprising a front wall 18, a pair of opposing side walls 20 and 22 and a rear wall 24. The bottle 12 further includes a top 26 and a sloped bottom 28. The top 26 has a pair of openings 30 that can be used to fill, empty or vent the bottle. The bottom 28 slops downward to a discharge valve 32 for nearly complete emptying of the bottle from the bottom. The bottom 28 includes a sump-area 35 adjacent the discharge valve 32 which provides nearly complete emptying of the bottle from the top with a dip tube. A safety pan 33 is mounted below the valve 32 and provides protection for the valve from below. In the embodiment illustrated, the front, rear and side walls are substantially planar so as to enable multiple containers to be placed side-by-side in surface-to-surface engagement with one another along the upright wall 16. The openings 30 are formed within a recess 34 below the uppermost portion of the bottle top 26 to provide protection for the openings 30. However, the recess 34 allows drainage of any spilled liquid so that spills are avoided when the container is tilted as described below.

The upright wall 16 is formed with a plurality of circumferential grooves 36 to stiffen the upright wall. Furthermore, the grooves 36 form recesses for straps 38 used to secure the bottle 12 within the steel frame 14. The grooves retain the straps in place along the upright wall of the bottle 12.

The steel frame 14 is constructed of a bent tube 40 welded together so as to be endless in nature. The tube 40 is configured to form four upright posts, front posts 42 and 44 and rear posts 46 and 48 with one post at each of the corners 50 between adjacent portions of the upright wall 16. The two front posts 42 and 44 adjacent the front wall 18 are connected at their upper ends by a horizontal crossbar 52 while the two rear posts 46 and 48 are connected at their upper ends by a horizontal crossbar 54. The crossbars 52 and 54 are above the top 26 of the bottle and form fork pockets for transport of a single container or a pair of containers by a forklift. In addition, the crossbars serve as handles for the container, particularly the rear crossbar 54 as described below. By being horizontal, the crossbars can be used as a support for a pallet or other platform on top of a multitude of containers 10, enabling a second level of containers to be stacked thereupon as discussed below in connection with FIG. 7. Front posts 42 and 44 also provide protection for the discharge valve 32.

The upright posts 42 and 48 adjacent side wall 20 are connected at their lower ends by a side bar 56 while the upright posts 44 and 46 adjacent side wall 22 are connected by a second side bar 58. The upright posts 42 and 44 and crossbar 52 form an inverted U-shape as do the upright posts 46 and 48 and crossbar 54. A support pan 29 is attached to the side bars 56 and 58 to both support and protect a portion of the bottom 28 of the bottle 12. When viewed from the side, upright posts 42 and 48 and side bar 56 form a U-shape as do upright posts 44, 48 and side bar 58. The U-shaped structure of the frame enables easy replacement of the bottle 12.

The side bars 56 and 58 are at their lowest point adjacent to the front wall 18 forming a pair of fixed legs 60 extending below the tank 12. From the legs 60 rearward, the side bars 56 and 58 generally slope upwardly to the rear upright posts 46 and 48. A bent wire kick-stand 62 is pivotally attached to the rear upright posts 46 and 48 at the two ends of the bent wire. As shown in FIGS. 2 and 3, the kick-stand extends downwardly from its pivot point 63 forming a pair of rear legs 64 and 66 at opposite lateral sides of the container. The rear legs 64 and 66 are positioned slightly forward of the kick-stand pivot point 63 such that the weight of the container on the kick-stand 62 acts to rotationally bias the kick-stand against the rear wheel 70 whereby the wheels 70 serve as a stop to rotation of the kick-stand.

The side bars 56 and 58 each carry a main wheel 72 for use in moving the container 10. The main wheels are sized in relation to the front legs 60 and rear legs 64 and 66 so that when the kick-stand is in the down position, the main wheels 72, front legs 60 and rear legs 64 and 66 contact the ground and define a support plane 74 for the container as shown in FIG. 2. The main wheels 72 are rotatable about a laterally extending axis 75 which is positioned slightly rearwardly of the center of gravity 76 of the tank and contents in the upright position.

When it is desired to move the container 10, the kick-stand 62 is rotated upward about the pivot 63 to the broken line position shown in FIG. 2. This is made possible by first slightly tipping the tank forward, transferring the tank weight to the front legs 60 and removing the weight from the kick-stand 62 so that the kick-stand can be raised. The kick-stand includes a raised center portion 80 which assists in rotating the kick-stand by foot. Once the kick-stand has been raised, the tank is self supporting on the front legs 60 and the two main wheels 72. Due to the position of the container's center of gravity between the axis 75 of the main wheels and the front legs, the tank is inherently stable in this position. For moving, the tank is tilted rearward to the tilted position shown in FIG. 4 in which the tank is supported by the main wheels 72 and the smaller rear wheels 70 at the rear of the container. The main and rear wheels 72 and 70 respectively define a second support plane 78 for the container 10. Because the rear wheels 70 are spaced from the first support plane, the second support plane 78 is inclined relative to the first support plane 74.

In tilting the container to the moving position shown in FIG. 4, the center of gravity 76 is passed over the axis 75 of the main wheels 72 such that the center of gravity is now rearward of the main wheels 72 but forward of the rear wheels 70. In this position, because the tank is supported on both sides of the center of gravity, it is inherently stable and does not require the aid of a person to hold the container in the tilted position. By being supported entirely by the wheels, the container can be easily moved by pushing the container. One person can simply and safely move the container. The tilting and moving are accomplished through the crossbar 54 serving as a handle. Because the center of gravity is closer to the main wheels 72 than the rear wheels 70, the container can be steered by raising the container off the rear wheels and turning the container on the two main wheels.

FIGS. 5 and 6 are enlarged views illustrating the kick-stand 62 when in the lowered position for supporting the container upright and in the upper position for moving the container.

The bottle 12 of the container 10 is configured so that the vertical envelope defined by the front, rear and side walls of the bottle extend beyond the frame 14, kick-stand 62 and wheels 70 and 72 as shown by the broken lines extending downward from the bottle in FIGS. 1 and 2. As a result, when multiple bottles are adjacent one another as shown in FIGS. 7 and 8, the planar walls of the bottle can be placed in surface-to-surface engagement with the planar surfaces of an adjacent bottle. However, when the kick-stand is in the raised position, the center portion 80 of the kick-stand extends rearwardly beyond the boundary of the rear bottle wall 24 as shown in FIG. 2. An adjacent tank can not now be placed in contact with the rear wall and thus, serves as an indicator to a workman that the kick-stand is up, rather than down.

The container 10 can be made in various sizes providing various volume capacities. However, a preferred size for the container is a 55 gallon capacity. In a preferred embodiment, the rectangular shape of the container has a length equal to 1.5 times the width of the container. This enables five containers to be oriented together as shown in FIG. 8 with three tanks positioned side-to-side and two tanks positioned end to end at one end of the first three tanks. With a 55 gallon capacity container having a width dimension of approximately 16 inches and a length dimension of approximately 24 inches, it is possible to position the five containers 10 shown in FIG. 8 upon a standard size pallet 86 measuring 48 by 42 inches. Once positioned upon a pallet, a support platform 84 can be placed upon the top of the frame crossbars 52 and 54 and a second layer of five containers can be stacked upon the five lower containers.

The container 10 of the present invention meets the objectives of the present invention by providing a container having an integral four wheel dolly that enables the container to be moved by one person in a tilted position while remaining inherently stable. Furthermore, the container is provided with four substantially planar upright walls so that multiple containers can be placed together and side-by-side engaging relationship such that less storage space is required for multiple containers of a given total capacity as compared to conventional drums of the same capacity.

FIGS. 9 through 11 illustrate transport container 110, an alternative embodiment of the container of the present invention. Container 110 is similar to container 10 in several respects and therefore, similar components are given the same reference numerals with the addition of 100. Tank 110 includes a blow molded bottle or tank 112 carried upon a steel frame 114. The frame 114 includes a pair of main wheels 172 and a single rear wheel 170. The frame is comprised of upright posts 142, 144, 146 and 148 at the front and rear of the tank 112. The container 110 is of a smaller capacity than the container 10 and has as its primary market the agricultural market. As such, the container 110 will be transported upon uneven terrain and the wheels 170 and 172 are wider than the wheels of container 10 to improve ease of transport over the uneven terrain.

Due to the smaller size of container 110, the horizontal cross bar 154 at the rear of the container is not at a convenient height to serve as a handle for the container. A handle/kick-stand 188 is rotatably mounted to the rear frame posts 146 and 148 for rotation at pivot 190. In the lowered position shown in FIG. 9, the handle/kick-stand serves as a kick-stand in place of the kick-stand 62 of container 10. The handle/kick-stand 188 includes a pair of feet 192 for contact with the ground when used as a kick-stand to keep the center grip 194 from contacting the ground. In the raised position shown in FIG. 11, the hand/kick-stand 188 is in a raised position in which the grip 194 extends well above the top of the tank 112 so as to be conveniently located for reach by a person attempting to move the container.

The handle/kick-stand 188 is held in both the lowered kick-stand position and the raised handle position by a pair of spring biased pins 196 which are insertable into apertures 198 in the rear upright posts 146 and 148 when in the lowered kick-stand position and insertable into apertures 199 when raised into the handle position. Pull knobs 191 are used to retract pins 196 from the apertures to enable rotation of the handle/kick-stand 188 between the lowered and raised positions. The top 126 of the tank 112 is sloped downward at the rear 193 to provide clearance for the end 195 of the handle/kick-stand as it is rotated between the raised and lowered positions. For transport, the kick-stand is raised for use as a handle and the container is tilted rearward onto the rear wheel 170. During rearward tilting, the center of gravity is passed over the axis of rotation of the main wheels 172 as occurs with container 10.

It is to be understood that the invention is not limited to the exact construction illustrated and described above, but that various changes and modifications may be made without departing from the spirit and scope of the invention as defined in the following claims. For example, while the container is shown with a separate bottle 12 and frame 14, it is possible to construct the container of a metal tank or bottle to which the wheels, handle and kick-stand are directly mounted without a separate frame.

We claim:

1. A transport container for shipping of bulk materials comprising:
    a tank having an upright wall including fore and aft spaced front and rear walls and laterally spaced opposing side walls, a top and a bottom;
    front leg means forming at least one fixed leg attached to said tank adjacent said front wall;
    a pivot leg extending below said bottom adjacent said rear wall in a first position in which said pivot leg and said front leg means support said tank in an upright position;
    main wheel means for forming a rotatable support positioned fore and aft between said fixed and pivot legs with the center of gravity of said container and contents being located between said front leg means and said main wheel means in the upright position of said container, said main wheel means, said front leg means and said pivot legs defining a first support plane for said container;
    secondary wheel means for forming a rotatable support positioned rearward of said main wheel means and spaced from said first support plane, said main and secondary wheel means defining a second support plane inclined relative to said first support plane;
    said pivot leg being rotatably mounted to said container for rotation upward from said first position to a second position above said first support plane whereby said tank remains supported substantially upright on said front leg means and said main wheel means; and
    said tank, when said pivot leg is in said second position, being rotatable upon said main wheel means to lower said secondary wheel means to a support surface whereby said main and secondary wheel means support said tank in a tilted position in which said center of gravity is between said main and secondary wheel means whereby said container is inherently stable in said tilted position.

2. The transport container of claim 1 wherein said pivot leg is integrally formed as a kick-stand rotatably mounted to said container.

3. The transport container of claim 1 wherein said pivot leg, when in said first position, is biased by the weight of said container to remain in said first position.

4. The transport container of claim 1 further comprising means forming a handle above the top of said tank.

5. The transport container of claim 4 wherein said handle means forms a pair of fork pockets for the tines of a forklift above oppositely spaced walls of said tank.

6. The support container of claim 1 wherein said front leg means, said main wheel means, said secondary wheel means, and said pivot leg when in said first position, are all within a vertical envelope defined by said front, rear and side walls of said tank.

7. The transport container of claim 6 wherein said kick-stand, when in said second position extends outwardly from said vertical envelope defined by said rear wall whereby two adjacent containers can not be positioned in wall-to-wall engagement with the rear wall of one container in which the kick-stand is in said second position.

8. The transport container of claim 1 further comprising a discharge outlet at the bottom of said tank.

9. The transport container of claim 1 wherein said front, rear and side walls, are substantially planar whereby a plurality of said containers can be placed adjacent to one another with said upright walls in surface-to-surface engagement.

10. The transport container of claim 9 wherein when viewed in plan, said container has a length approximately equal to 1.5 times the width.

11. The transport container of claim 10 wherein said length is approximately 24 inches and said width is approximately 16 inches whereby five such containers can be placed on a 48×42 inch pallet with three tanks positioned side-by-side and two tanks positioned end-to-end at one end of said first three containers.

12. A transport container for shipping bulk materials comprising:
    a tank having an upright wall, a top and a bottom;
    a frame for supporting and carrying said tank, said frame including a pair of legs at a front of said container extending downwardly below said tank, a pair of legs at a rear of said container having a first position extending downwardly below said tank;

a pair of laterally spaced main wheels mounted to said frame for rotation about a first lateral axis positioned between said front and rear legs and rearward of the center of gravity of said container and contents, said frame and rear legs and said main wheels defining a first support plane above which said upright wall is supported in a substantially vertical direction; and means forming a rear wheel mounted to said frame for rotation about a second lateral axis rearward of said first axis, said rear wheel means being spaced from said first support plane and together with said main wheels defining a second support plane inclined relative to said first support plane;

said rear legs being rotatable to a raised position above said rear wheel means whereby said container can be tilted rearward onto said second support plane and supported by said main wheels and said rear wheel means, the angle of inclination between said first and second support planes being such that when said container is tilted onto said second support plane, the center of gravity of said container passes over said first axis to a position between said main and rear wheels whereby said container is inherently stable in the tilted position.

13. The transport container of claim 12 wherein said rear legs are integrally formed together as a kick-stand rotatably mounted to said frame.

14. The transport container of claim 13 wherein said kick-stand is rotatable between a lowered position forming said rear legs below said tank and a raised position above said tank in which said kick-stand forms a handle for said container.

15. The transport container of claim 14 further comprising means for retaining said kick-stand in said lowered position and in said raised position.

16. The transport container of claim 12 wherein said rear legs are biased by the weight of said container to remain in said first position.

17. The transport container of claim 12 wherein said frame extends above the top of said tank forming handles for said container.

18. The transport container of claim 17 wherein said handles form a pair of fork pockets for the tines of a forklift above said tank.

19. The transport container of claim 12 wherein said frame and said wheels are within a vertical envelope defined by said upright wall.

20. The transport container of claim 12 wherein said upright wall includes substantially planar front, rear and side walls whereby a plurality of identical containers can be placed adjacent to one another with said upright walls in surface-to-surface engagement.

21. The transport container of claim 19 wherein said kick-stand, when in said second position extends outwardly from said vertical envelope whereby two adjacent tanks can not be positioned in surface-to-surface engagement with the rear of a container in which the kick-stand is in the second position.

22. The transport container of claim 12 wherein said frame includes a pair of laterally spaced front posts, a pair of laterally spaced rear posts, a front crossbar connecting said front posts at the upper ends thereof and a rear crossbar connecting the rear posts at the upper ends thereof, said crossbars and posts forming fork pockets for lifting said container with a fork truck, and side bars connecting each front post to a rear post along sides of said container at the lower ends of said posts.

23. The transport container of claim 22 wherein said rear legs are integrally formed together as a kick-stand mounted to said laterally spaced rear posts for rotation from a lowered position serving as said rear legs to a raised position serving as a handle above said tank.

24. The transport container of claim 22 wherein said frame is formed of a continuous bent tube.

25. A transport container for shipping of bulk materials comprising:

a tank having an upright wall including fore and aft spaced front and rear walls and laterally spaced opposing side walls, a top and a bottom;

means forming front legs extending below said bottom adjacent said front wall for contact with a supporting surface;

means forming rear legs extending below said bottom adjacent said rear wall, said rear legs being rotatably mounted to said tank for rotation relative to said tank between a lowered position forming rear legs for said tank and a raised position forming a handle above said tank; and wheel means rearward of said front leg means for supporting said tank when said rear leg means is in said raised position, said wheel means including a main wheel rotatable about a first axis of rotation rearward of the center of gravity of said container for supporting said container together with said front leg means with said upright wall extending substantially vertically and a secondary wheel spaced vertically higher than said main wheel and having a second axis of rotation rearward of said first axis of rotation and parallel thereto whereby said tank can be tilted rearward onto said main and secondary wheels when said rear leg means is in said raised position and said center of gravity of said container is passed over the first axis to a position between said first and second axes.

* * * * *